Figure 1:
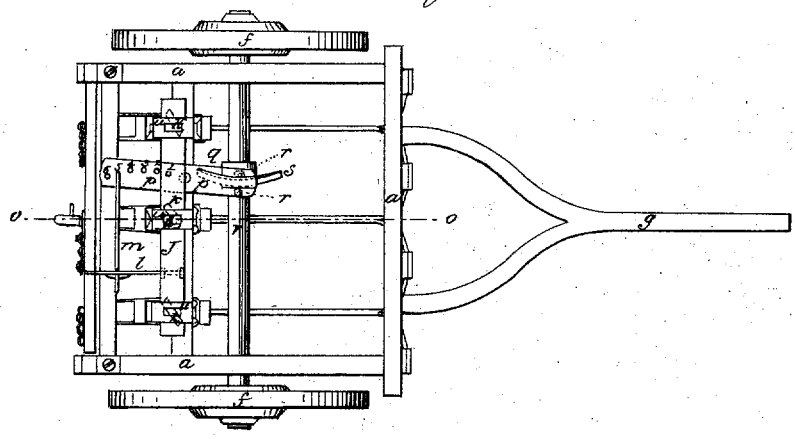

L. MOORE.

Grain-Drill.

No. 224. Reissued Oct. 12, 1852.

AM. PHOTO-LITHO. CO. N.Y. (OSBORNE'S PROCESS.)

UNITED STATES PATENT OFFICE.

LEWIS MOORE, OF BART, PENNSYLVANIA.

IMPROVEMENT IN THE SEEDING APPARATUS OF SEED-PLANTERS.

Specification forming part of Letters Patent No. 7,479, dated July 2, 1850; Reissue No. 224, dated October 12, 1852.

*To all whom it may concern:*

Be it known that I, LEWIS MOORE, of Bart, in the county of Lancaster and State of Pennsylvania, have invented certain new and useful Improvements in Seeding-Machines; and I do hereby declare that the following is a full and exact description thereof, reference being had to the accompanying drawings, making part of this specification.

Seed-planters are in common use in which the feeding action is accomplished by the unvarying motion of a sliding gage pierced with apertures corresponding more or less nearly with those in the grated or perforated bottom of the hopper over or under which it slides; but these are subject to serious objections, as not only is the seed let down intermittingly, but a constant quantity is invariably sown, unless the feeding apparatus is changed, which cannot be done while the machine is in motion; and, besides, on account of parallel edges of the grate and gage apertures coming together, the seed is caught between them, and thereby clogs the machine and is more or less broken.

Now, one characteristic of my invention is the attainment of a uniform and continual distribution of the seed upon the ground by means of oblique apertures in the sliding gage or feeding-plate, in connection with apertures in the bottom of the hopper, whose sides are parallel with those of the hopper, or, at least, form a considerable angle with those of the gage-apertures; and, besides, all clogging or breaking of the seed is thereby obviated.

Another characteristic of my invention consists in causing the reciprocating motion to be communicated to the sliding gage by means of a rod connected with said gage, or with an arm projecting from the same, by a loose joint, and having its other end to terminate in a hook, or equivalent form, which is inserted in any one of a series of apertures formed at different distances from the fulcrum or pivot of a uniformly-vibrating lever operated by a curved disk on the revolving axis of the supporting-wheels, which adjustable rod is situated in such a position that it may be readily controlled by the operator, and thus enable him to change said rod to different distances from the fulcrum of the said vibrating lever, so as to vary the extent of the reciprocating motion of the gage-plate, and thereby vary the quantity of seed sown at pleasure or stop the feeding of the seed by raising the rod from the lever, when required, without stopping or retarding the machine.

Another improvement in my machine consists in regulating the depth at which the drill-teeth plow, and raising them, singly or all together, from the ground, by means of a flattened eccentric vibrating bar, and by chains, adjustable in length, reaching from the several drill-teeth to the said bar, and readily attached thereto or detached therefrom, the peculiar construction and arrangement of which device, as hereinafter described, renders it the most effective and simple means for performing its assigned functions that has hitherto been invented.

Figure 3:
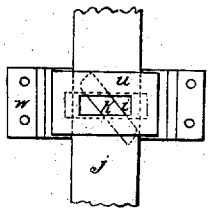
Figure 5:
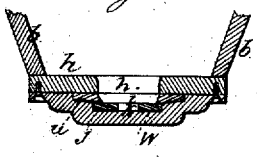
Figure 4:
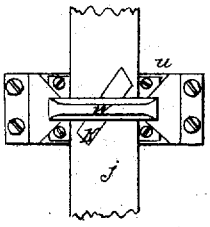
Figure 2:
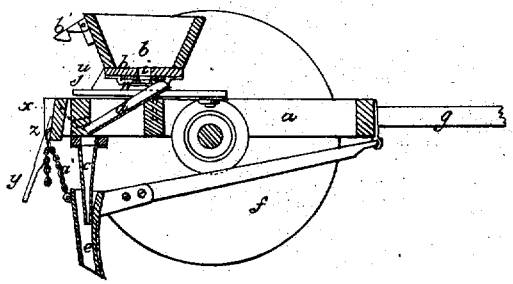

In the accompanying drawings, Figure 1 is a plan or top view of the machine, the hopper being removed in order to show the reciprocating feeding or gage plate and the relative positions of its oblique apertures and the oblong transverse apertures in the grate-plates, which are secured to the bottom of the hopper. Fig. 2 is a longitudinal vertical section of the same in the line *o o* of Fig. 1; Fig. 3, a plan of a portion detached; Fig. 4, a plan of the same portion inverted; Fig. 5, a transverse vertical section through one of the feeding-passages and part of the hopper.

The same letters refer to like parts in all the figures.

The frame *a*, hopper *b*, guiding-tubes *c*, chute *d*, drill-teeth *e*, wheels *f f*, pole *g*, &c., are constructed in any usual and convenient manner, and need no description, not forming any part of my invention.

The bottom *h* of the hopper *b* is provided with transverse oblong apertures at distances apart corresponding with those of the drill-teeth below, the sides of which apertures I usually arrange parallel with those of the hopper; and a loop-plate, *u*, is secured under each of said apertures, so that an aperture, *i*, with which each loop-plate is furnished, will fall directly under and correspond in shape, size, and position with said apertures in the bottom of the hopper. A loop, *w*, is formed on the under side of each plate *u*, corresponding in shape, size, and position with its aperture directly above, and serves both to support and guide the gage-plate *j*, (presently to be described,) and to close the apertures above when the machine is not in motion. The gage-plate *j* slides in the loops *w w*, &c., the whole length of the hopper, and is furnished with oblong apertures *k k*, &c., equal in number to and corresponding in position with the apertures in the bottom of the hopper; but their sides are formed obliquely to those of the apertures of the hopper, usually at an angle of about forty-five degrees.

A reciprocating motion is imparted to the gage-plate by means of a lever, *p*, moving on a fulcrum or pivot, *q*, to which lever a uniform vibratory motion is given by a curved or undulating disk, *s*, fixed upon the revolving shaft *v* of the conveying-wheels, and moving between guides *r r* on said lever, which is provided with a series of holes, 1 2 3 4 5 6, at different distances from its fulcrum *q*, into which holes is inserted the hooked end of a rod, *m*, attached by a loose joint to the gage-plate *j*, or to an arm, *l*, projecting from the same. Said rod is situated so that it may be readily managed by the operator of the machine, who, by shifting the hook into different holes of the lever *p*, can vary the extent of motion imparted to the gage-plate *j*, and thereby vary and regulate the quantity of seed sown, as presently to be described, and can also stop the motion of the said gage-plate by holding the hook from the lever *p*, and consequently stop the feeding of the machine when turning, or at other times passing over ground not desired to be sown. When the gage-plate is not in motion the seed which fills the coinciding apertures *i k* is supported by the loop *w*, and is not discharged; but when said gage-plate is put in motion the oblique sides of its apertures are continually and gradually pushing the grain, which fills them alternately on one side and the other of the loops *w w*, into the drill-teeth, while the place of the grain thus discharged is constantly supplied by more grain from the hopper above.

It is obvious that the greater the extent of the reciprocating motion of the gage-plate or feeder the greater the quantity of seed sown, and vice versa. The seed is also constantly and evenly distributed to the ground, while the angle which the oblique apertures K K, &c., forms with the transverse apertures *i i*, &c., obviates any clogging or breaking of the seed, which would otherwise be occasioned.

A flattened eccentrically-vibrating bar, *x*, is mounted in bearings across the rear of the machine, and is furnished with a handle, *y*, by which it is turned up and down. A catch, *b'*, is attached to the rear of the hopper *b* for holding the said eccentric vibratory bar when turned up. The rear side of it, when turned down, is provided with a series of hooks, *z*, corresponding in number and situation with the drill-teeth *e*, to each of which a chain, *a'*, is attached. Said chains are attached to their respective hooks *z* by such a link, exchangeable at pleasure, as will give the required height at which the drill-teeth should be suspended when the bar *x* is turned down. When the machine is in operation the eccentric bar is placed in its lowest position, and the depth to which the drill-teeth plow is varied and regulated simply by causing said bar to be vibrated slightly forward and backward, which movement is quite gradual, as the flattened eccentric form of the bar causes, when it is turned down, the chains to be suspended in a direction not far from the center of the vibration, so that its first motion from that position acts to swerve rather than lift the chains. On account of the same peculiarity of construction, said bar, when turned completely up, raises the drill-teeth more suddenly and promptly than would a round roller, and when it is at its highest position it is held up with ease, because the lines of support to the drill-teeth become again nearly in the direction of the center of the bar's vibration.

When it is desired to raise a single drill-tooth its chain is lifted separately without disturbing the bar.

Having thus fully described my improvements in seeding-machines, I wish it to be understood that I do not claim a reciprocating gage-plate having apertures parallel and corresponding with apertures in the bottom of the hopper, as this, I am aware, is in use in other machines; but

What I do claim as my invention, and desire to secure by Letters Patent, is—

1. The employment of a reciprocating gage-plate, when provided with feeding-apertures, in combination with corresponding apertures in the hopper-bottom, which have their sides oblique to the sides of the apertures in the said reciprocating plate, and when combined with a device for giving it a variable reciprocating motion for the purpose of sowing the seed constantly and uniformly, and varying the amount at pleasure while the machine is moving by simply varying the extent of its reciprocating motion, as herein described.

2. The pivoted rod *m* and the vibratory lever *p*, which is provided with apertures arranged in the arc of a circle whose center is at the pivoted end of the rod *m*, in combination with the curved or undulating disk *s*, and the gage *j*, substantially as herein described, for the purpose of imparting to the gage-plate a reciprocating motion, which may be varied at pleasure by the operator by inserting the rod *m* in one or another of the apertures in the lever *p* at different distances from its fulcrum.

The above specification of my improved grain-drill signed by me this 31st day of July, 1852.

LEWIS MOORE.

Witnesses:
CHRISTOPHER GRAHAM,
JOHN WINKEAD.